Figure 1:
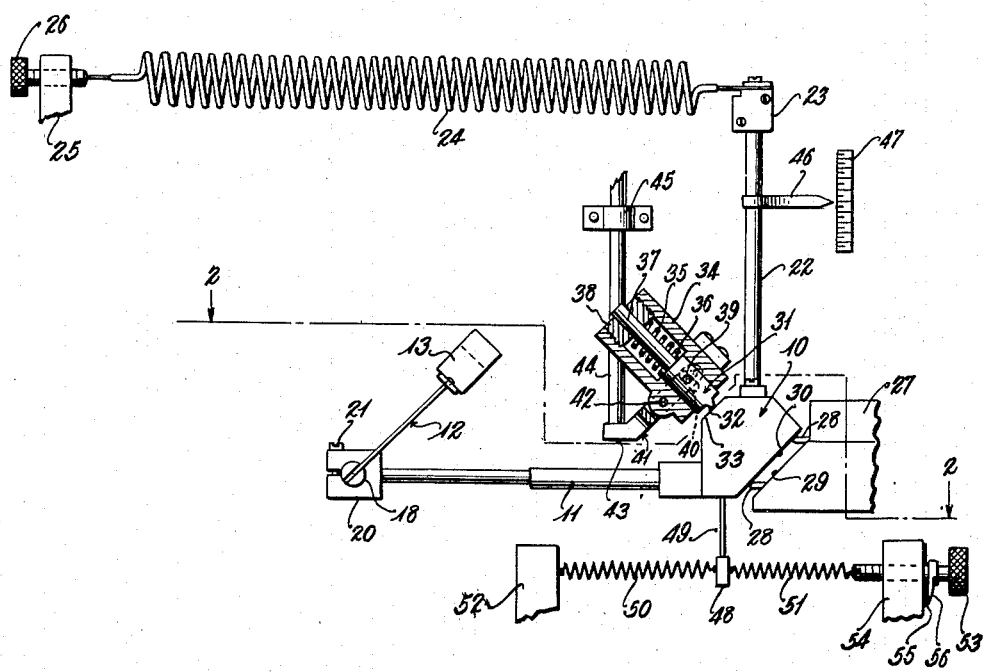

April 28, 1942.  D. H. CLEWELL  2,281,001

GRAVITY METER

Filed May 24, 1940

Inventor

Dayton H. Clewell

By  Dallas R. Lamont

Attorney

Patented Apr. 28, 1942

2,281,001

UNITED STATES PATENT OFFICE 2,281,001

GRAVITY METER

Dayton H. Clewell, Dallas, Tex., assignor, by mesne assignments, to Socony-Vacuum Oil Company, Incorporated, New York, N. Y., a corporation of New York Application May 24, 1940, Serial No. 336,898

7 Claims. (Cl. 265—1.4)

This invention relates generally to gravity meters and more particularly to an apparatus for nulling such instruments.

Many types of gravity meters are known in the prior art. Some of these types have been used with a degree of success in conducting geophysical surveys. However, to date no one has produced a satisfactory system for nulling instruments of this character. This is primarily due to the delicateness of the elements of the instrument itself and the small forces or variations in forces that must be measured.

Gravity meters which measure directly the force of gravity by observing the displacement of a mass are inaccurate, for from day to day the physical characteristics of the delicate elements comprising the operating mechanism of the instrument vary. Such variations obviously result in a change in the sensitivity of the instrument to the small forces or variations in force that it is desired to measure. Since in conducting reconnaissance geophysical surveys by means of the gravitational method one is only interested in the variations in gravitational force from point to point over an area of the surface of the earth, greater accuracy could be obtained by resorting to a null system for measuring these variations.

In every instance it is desirable to null the instrument without in any way affecting its sensitivity, for to change the sensitivity of the instrument while conducting a survey of a particular area would give erroneous results which would not be comparable and could not be correlated to give a true contour map that would be a picture of the elevation of the substrata.

The problem then immediately confronting the design engineer is to produce a null system by means of which the mass after displacement can be returned to its zero position or base station position by some means other than a variation of the elastic forces acting upon the mass. To this end the present invention affords a simple and effective method and apparatus for returning the mass to its zero position or base station reading by effecting a shift in the center of gravity of the mass thereby changing the effective lever arm through which the weight of the mass acts.

Therefore, it is the primary object of this invention to provide an apparatus for nulling a gravity meter of the horizontal beam type by shifting the center of gravity of the mass an amount sufficient to change the lever arm through which the weight of the mass acts that it will return to its zero or base station reading without altering the sensitivity of the device.

Another object of this invention resides in the provision of a null system by means of which the gravity meter mass after displacement can be returned to its zero or base station reading without applying any additional elastic forces to the pivoted mass.

Still another object of this invention resides in the provision of a null system for gravity meters which utilizes a very small auxiliary mass that is pendulously supported by the main mass and means for applying a small force to the auxiliary mass to shift it horizontally.

Figure 2:
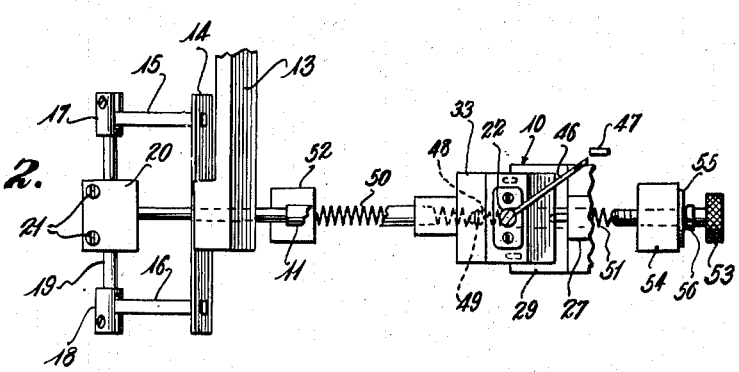

Other objects and advantages will become apparent from the following detailed description, when considered with the attached drawing, in which:

Figure 1 is a schematic elevational view of a horizontal pivoted beam type gravity meter showing the apparatus by means of which the mass is returned to its zero reading or base station reading after displacement; and Figure 2 is a plan view of the instrument partly in section taken along the line 2—2 of Figure 1.

Referring to the drawing in detail and particularly to Figure 1, there is shown schematically a gravity meter of the horizontal beam type comprising a mass 10 from which a beam 11 extends horizontally to a pivot 12. Pivot 12 is mounted upon a support 13 that is secured to the case, not shown, of the gravity meter. The pivot 12 is composed of a heavy bar spring 14 that is secured to the support 13 and to very light leaf springs 15 and 16. The heavy spring 14 being a rather stiff flat spring, serves to cushion any tension on the leaf springs 15 and 16 that might result from a small misalignment of the clamp when the mass is rigidly held in clamped position. The springs 15 and 16 are equally spaced on opposite sides of the beam 11 and are in parallel relation to each other. The upper ends of the leaf springs 15 and 16 are secured to the heavy spring 14 at points near the opposite ends thereof. The lower ends of springs 15 and 16 are clamped in the clutches 17 and 18 respectively, which are carried by the rod 19. The beam 11 is secured to the rod 19 by means of a clamp 20 which is formed integrally with the end of the beam or is rigidly secured thereto. The clamp 20 is rigidly secured to the rod 19 by means of screws or bolts 21 so that movement of the beam 11 in a vertical plane will rotate the rod 19 and cause the springs 15 and 16 to flex. The pivotal axis thus formed for the beam lies along a transverse line drawn across the approximate centers of the light springs 15 and 16.

In order to elastically equalize the gravitational forces acting upon the mass 10, an arm 22 is secured to the mass and is adapted to extend substantially vertically therefrom at an angle of 90° to the beam 11. The upper end of arm 22 is provided with anchoring means 23 to which one end of a tensioned coil spring 24 is secured. Spring 24 extends horizontally along a line that is substantially parallel to the beam 11 to a fixed anchorage 25 that is fastened to or a part of the gravity meter casing, not shown. Spring 24 is secured to the anchorage means 25 by means of an adjusting screw 26 which lies in axial alignment with the spring 24 and threadedly engages the anchorage means 25.

Since with devices of this character it is necessary to measure forces within an accuracy of one part in ten million, very delicate elements which will retain their physical characteristics must be used. Therefore, in order to maintain the physical characteristics of the delicate elements of this device constant, it is necessary that means be provided to rigidly clamp the mass 10 while the instrument is being subjected to jars or shocks which would alter these physical characteristics. To this end support 27 having fingers 28 projecting from its face 29 is secured to the gravity meter casing and disposed adjacent the mass 10. Mass 10 is provided with opposite parallel faces that are substantially parallel with the face 29 of the support 27. The fingers 28 are so formed that they make point contacts with face 30 of the mass 10 when the mass is forced into contact with them. On the opposite side of the mass from the support 27 there is provided a movable plunger 31 having a point 32 that is adapted to engage face 33 of the mass 10. The plunger 31 is slidably journaled within the cylindrical casing 34 and adapted to be forced outwardly and downwardly to contact the mass 10 by means of the coil spring 35. One end of the coil spring rests against an annular shoulder 36 formed on the plunger 31. The other end of the coil spring which is concentrically disposed about the stem 37 of the plunger 31 bears against a plug 38 which forms a closure for the cylindrical casing 34. Plug 38 is provided with a centrally disposed opening through which the stem 37 of the plunger 31 is adapted to project, it being understood that the stem 37 will slide freely in the opening in the plug 38. The plunger 31 is provided with pins 39 which extend from diametrically opposite sides through elongated openings 40 in the cylindrical casing 34. The pins 39 extend outside of the casing 34 far enough to engage the arms of a yoke 41. The yoke 41 is pivotally secured at 42 to the casing 34. The arm 43 of the yoke 41 extends outwardly at such an angle that a rod 44 extending from a point outside of the gravity meter casing and carried by bearings 45 can contact the arm 43 to pivot the yoke and retract the plunger 31 carrying the point 32 out of contact with the mass 10. It is obvious to those skilled in the art that this clamping means can be replaced by hydraulic clamping means or any other suitable means which would firmly secure the mass 10 against movement when the instrument is being moved from point to point.

Any suitable means known in the art can be used to measure the displacement of the mass 10, as for example, an indicator 46 carried by the arm 22 that is adapted to cooperate with a scale 47. The position of the indicator on the scale can be read to any desired accuracy by means of conventional telescope means. Optical systems well known in the art can also be used to magnify the displacement of the mass 10 to give a more accurate reading.

Inasmuch as one is only interested in the variations in gravitational force from point to point over an area on the earth's surface, it is preferable and more feasible to use a null system for measuring these extremely minute variations in force. For the most satisfactory results it is desirous to use a null system which will not alter the sensitivity of the instrument, that is, means which will return the mass to a zero or base station reading without varying the sensitivity of the device. To this end applicant has pendulously suspended from the mass 10 a very small mass 48 by means of an extremely light and flexible spring 49. The small mass 48 is spaced from the mass 10 a distance sufficiently far that by moving it horizontally in a direction parallel to the beam 11, the effective center of gravity of the entire mass assembly can be shifted sufficiently far to null the instrument or bring it back to the zero or base station reading under any conditions encountered in measuring the variations in gravitational force. To effect a horizontal movement of the small mass 48 there is provided two light springs 50 and 51 that extend in axial alignment from opposite sides of the mass 48. The outer end of spring 50 is anchored to a fixed support 52 that is secured to the gravity meter casing, not shown, while the outer end of spring 51 is axially secured to an adjusting screw 53 which passes through and threadedly engages a support 54 that is secured to the gravity meter casing, not shown. Springs 50 and 51 are very light and normally under sufficient tension that a change in the adjustment of screw 53 will cause the mass 48 to shift in the desired direction.

In operation in conducting a geophysical survey of a particular area, a plurality of stations are located over this area in such a manner that they will afford substantially complete coverage. Then a base or reference station is selected and the gravity meter set up at this point. The mass is then unclamped and by means of the screw 26, shown in Figure 1, the mass and indicator 46 carried thereby is caused to move until the indicator travels to approximately the zero point on the scale 47. Further adjustment is then made of the position of the mass to bring the pointer 46 exactly to the zero mark on the scale 47 by horizontally shifting the mass 48 by means of the springs 50 and 51 and the adjusting screw 53. When this zero condition is attained, the instrument is clamped by causing the plunger 31 to move downwardly causing the point 32 carried thereby to press against the face 33 of the mass 10. Plunger 31 is allowed to force the mass down firmly against the pins 28 to securely clamp it against movement which would injure or change the physical characteristics of the delicate elements that support the mass when the instrument is being moved to a new location. After the mass has been securely clamped, the instrument is moved to a new location and properly set up at that point. Then the mass is released and the amount of horizontal displacement of the mass 48 required to bring the indicator 46 carried by the main mass back to the zero point on the scale 47 is read. The scale 55 which cooperates with the pointer 56 carried by the screw 53 can be calibrated in units of gravity and readings made from this scale are proportional to variations in gravitational force between the base or reference station and the station under observation.

After the reading has been made at the station, the mass is clamped in the manner described above and the process repeated until the entire area has been covered. The data thus gathered is then plotted in the form of contour maps which simulate the elevation of the substrata.

Many other detailed features that may be added as refinement to the gravity meter illustrated will immediately become apparent to those skilled in the art, and it is to be understood that the scope of this invention includes the principles of this invention regardless of whether or not these numerous additional features are incorporated.

I claim:

1. In a gravity meter that comprises a support, a main mass, means for pivotally securing the mass to the support in such a manner that the pivotal point and the center of gravity of the mass are in different vertical planes, elastic means for supporting the mass against the action of vertical components of gravitational force, means for indicating the disposition of the mass relative to the support, and means for nulling the gravity meter by returning the mass to a predetermined indicated position, said means comprising an auxiliary mass pendulously fixed to the main mass and means for shifting the auxiliary mass in a substantially horizontal direction to effect a change in the location of the center of gravity through which gravitational forces act.

2. In a gravity meter that comprises a support, a main mass, means for pivotally securing the mass to the support in such a manner that the pivotal point and the center of gravity of the mass are in different vertical planes, elastic means for supporting the mass against the action of vertical components of gravitational force, means for indicating the disposition of the mass relative to the support, and means for nulling the gravity meter by returning the mass to a predetermined indicated position, said means comprising an auxiliary mass pendulously fixed to the main mass, and means for shifting the auxiliary mass in a substantially horizontal direction to effect a change in the lever arm through which the weight of the masses acts.

3. In a gravity meter that comprises a support, a main mass, means for pivotally securing the mass to the support in such a manner that the pivotal point and the center of gravity of the mass are in different vertical planes, elastic means for supporting the mass against the action of vertical components of gravitational force, means for indicating the disposition of the mass relative to the support, and means for nulling the gravity meter by returning the mass to a predetermined indicated position, said means comprising an auxiliary mass pendulously carried by, but fixed to the main mass, and elastic means for shifting the auxiliary mass in a substantially horizontal direction to effect a change in the center of gravity of the system which comprises the main mass and the auxiliary mass.

4. In a gravity meter that comprises a support, a main mass, means for pivotally securing the mass to the support in such a manner that the pivotal point and the center of gravity of the mass are in different vertical planes, elastic means for supporting the mass against the action of vertical components of gravitational force, means for indicating the disposition of the mass relative to the support, and means for nulling the gravity meter by returning the mass to a predetermined indicated position, said means comprising an auxiliary mass pendulously fixed to the main mass, common means for shifting the auxiliary mass in a substantially horizontal direction to effect a change in the lever arm through which the center of gravity of the system formed by the main mass and the auxiliary mass acts, and for elastically holding the auxiliary mass in its shifted position.

5. In a gravity meter that comprises a support, a main mass, means for pivotally securing the mass to the support in such a manner that the pivotal point and the center of gravity of the mass are in different vertical planes, elastic means for supporting the mass against the action of vertical components of gravitational force, means for indicating the disposition of the mass relative to the support, and means for nulling the gravity meter by returning the mass to a predetermined indicated position, said means comprising an auxiliary mass, elastic means for pendulously suspending the auxiliary mass from the main mass, and means for shifting the auxiliary mass relative to the main mass to effect a change in the lever arm through which the weight of the masses acts.

6. In a gravity meter that comprises a support, a main mass, means for pivotally securing the mass to the support in such a manner that the pivotal point and the center of gravity of the mass are in different vertical planes, elastic means for supporting the mass against the action of vertical components of gravitational force, means for indicating the disposition of the mass relative to the support, and means for nulling the gravity meter by returning the mass to a predetermined indicated position, said means comprising an auxiliary mass, elastic means for pendulously suspending the auxiliary mass from the main mass, common means for shifting the auxiliary mass relative to the main mass to effect a change in the lever arm through which the weight of the masses acts, and for elastically holding the auxiliary mass in shifted position.

7. In a gravity meter that comprises a support, a main mass, means for pivotally securing the mass to the support in such a manner that the pivotal point and the center of gravity of the mass are in different vertical planes, elastic means for supporting the mass against the action of vertical components of gravitational force, means for indicating the disposition of the mass relative to the support, and means for nulling the gravity meter by returning the mass to a predetermined indicated position, said means comprising an auxiliary mass, pendulously fixed to the main mass, means for shifting horizontally the position of the auxiliary mass relative to the main mass to effect a change in the center of gravity of the system formed by the main mass and the auxiliary mass, and serving as an elastic suspension for holding the auxiliary mass in its shifted position.

DAYTON H. CLEWELL.